Figure 1:
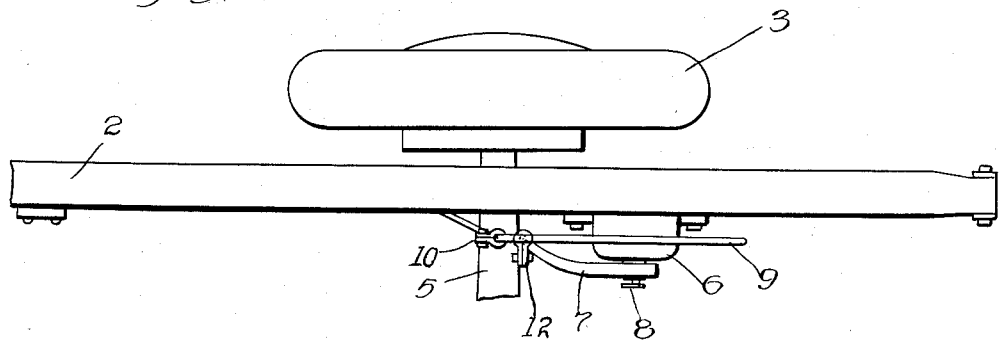

Oct. 17, 1939.  A. TRASK  2,176,159

DIFFERENTIAL SPRING SUSPENSION FOR VEHICLES

Filed Oct. 6, 1937

Witness:
Harry R. L. White

Inventor
Allen Trask.
By Harvey L. Hanson
Attorney.

Patented Oct. 17, 1939

2,176,159

UNITED STATES PATENT OFFICE 2,176,159

DIFFERENTIAL SPRING SUSPENSION FOR VEHICLES

Allen Trask, Chicago, Ill.

Application October 6, 1937, Serial No. 167,481

1 Claim. (Cl. 267—16)

This invention relates to improvements in spring suspensions and shock-absorbing mechanisms for vehicles.

Speed responsive double-acting hydraulic shock-absorbers providing a variable resistance increasing approximately proportional to the square of the speed of movement, are in general use on automotive vehicles. They are used for controlling both the fast frequency wheel oscillations and the relatively slow frequency body oscillations at the same time, with compromise resistances. Against fast wheel oscillations they provide a too heavy resistance that reacts to vibrate the vehicle body, and against relatively slow body oscillations they offer a light resistance that is not sufficient to eliminate bouncing of the vehicle body.

Smooth riding requires spring freedom for fast wheel oscillation, and a slowly timed spring control for the elimination of body frequency bounce. These requirements are opposite to the inherent characteristics of the speed responsive hydraulic shock-absorber now in general use, that provides greater resistance to fast wheel oscillations than it does to relatively slow body oscillations.

Vehicle springs, also, are called upon to meet conflicting demands. They must provide at the same time a fast frequency for wheel oscillations, and a slow frequency for body oscillations. Fast wheel oscillations require a stiff spring and light shock-absorber resistance. The prevention of bounce at slow body frequencies requires a soft spring controlled by a shock-absorber resistance sufficient to check spring reactions to movements slower than their tendency to move at their natural frequencies.

Conventional spring and shock-absorber mechanisms meet these conflicting spring and shock-absorber requirements by compromises in both design and riding quality.

This invention provides vehicle springs that are at once both stiff and soft, and hydraulic shock-absorbers that simultaneously present light resistance to fast wheel oscillations and slowly timed escapement that takes the bounce out of vehicle body oscillations.

Greatly improved riding quality is attained by this invention through the fulfillment of its following specific objects:

Object No. 1

A spring and shock-absorber mechanism for vehicles that will differentiate between wheel oscillations of rapid frequency and vehicle body oscillations of relatively slow frequency, to the end that any oscillation of either wheel or body will be met by the corresponding combination of resilience and resistance that will prevent any vibration or bounce being imparted to the vehicle body from any road at any vehicle speed.

Object No. 2

A vehicle spring suspension comprising two sets of springs, a first set providing a slow oscillation frequency for the vehicle body, and a second set that when coupled in parallel with the first set provides for a faster wheel oscillation frequency than would either spring set alone.

Object No. 3

A spring-differential mechanism arranged with two springs for each wheel of a vehicle, and disposed to call into effect or eliminate the resilient effect of one of these springs on its respective wheel as the vehicle speed and road conditions demand for the smoothest riding.

Object No. 4

A shock-absorbing mechanism capable of exerting two distinct types of resistance to meet two distinctly different demands, or any combination of the two demands called for by the road shock transferred to a moving vehicle.

Object No. 5

A vehicle spring and shock-absorbing mechanism that will provide equal hydraulic resistance to both compression and rebound of vehicle springs as road conditions may require for smoothest riding.

Object No. 6

The elimination of a double jointed connector or link between the shock-absorber arms and the axles of a vehicle.

Object No. 7

The elimination of excessive strain, wear and damage to vehicle hydraulic shock-absorbers and connections that is caused by excessive road shocks, incorrect adjustment, or excessive fluid viscosity resulting from low temperatures.

Object No. 8

A vehicle spring and shock-absorber mechanism that will simultaneously provide freedom for fast frequency wheel oscillations and an ideal amount of hydraulic resistance for minimizing relatively slow body oscillations.

Object No. 9

The minimizing of vehicle body side-sway by the resisting tension of a laterally flexible shock-absorber link.

Object No. 10

A differential spring suspension mechanism including an hydraulic dash-pot shock-absorber that does not require an adjusting valve, a pressure relief valve, or a check valve.

Object No. 11

A spring suspension that permits the use of softer springs for carrying the vehicle load, because of an auxiliary spring disposed to provide additional support to the main spring, as it is needed.

In this specification the discussion of "wheels" refers to the "unsprung-weight" of a vehicle, that is, all those parts such as brakes, etc., that, by reason of the springs, may move with the wheels in a vertical plane in following the surface of a road. "Body" is used to refer to the "sprung-weight" including all the parts of a vehicle that may not be classified as "unsprung-weight". In short, "wheel" is synonymous with "unsprung-weight", and "body" with "sprung-weight".

Figure 2:
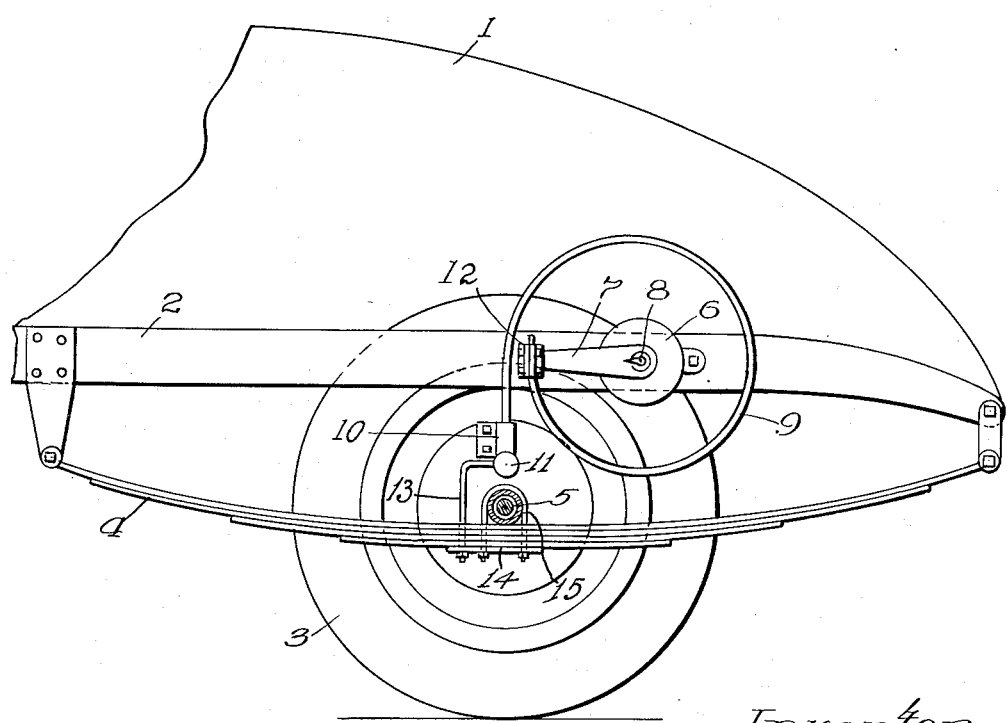

In the drawing Fig. 1 is a top plan view of a portion of a vehicle illustrating my invention applied thereto and Fig. 2 is a side elevation thereof.

The automobile body 1, mounted on frame 2 is shown in its relation to one of the rear wheels 3 mounted on axle 5. A conventional semi-elliptic leaf spring 4 is shown joined to the frame 2 and the axle 5 in a customary manner. This spring will hereinafter be referred to as body-spring 4.

A shock-absorber of a well known type of double-acting rotary-piston dash-pot is shown at 6. This shock-absorber provides an equal hydraulic resistance to equal forces moving the shock-absorber arm 7 in either direction. A pointer 8 provides adjustment means for the dash-pot by-pass valve that in turn controls the hydraulic resistance of the shock-absorber.

A wheel-spring 9 is a stiff but resilient loop of spring-steel rod formed into the spiral shape shown. Wheel-spring 9 is secured at one end to the axle 5 by means of clamp 10 and ball-socket joint 11, arm 13, spring clamp plate 14 and U-bolt 15; and at the other end it is secured to the shock-absorber arm 7 by means of clamp 12.

Good riding quality may be gained through the use of this invention, by adjusting dash-pot 6 to provide resistances sufficient to limit the amplitude of reaction to compression and extension of body-spring 4 to an amount approximately equal to the amplitude of said compression and extension, as body 1 moves in vertical relation to the horizon upon the flexing of body-spring 4.

Wheel spring 9 is designed with such deflection-tension characteristics that it is stiff enough to cause dash-pot 6 to follow substantially the complete amplitude of movement of body 1 in vertical relation to the horizon at its natural frequency of oscillation on body-spring 4, but not have sufficient stiffness to cause dash-pot 6 to follow the full amplitude of the relative movements between wheel 3 and body 1 at rates of oscillation that are faster than the natural frequency of oscillation of the body.

During relatively slow oscillations of body 1 in range of its natural frequency on body-spring 4, there is sufficient time at the ends of each oscillation stroke, where the direction of oscillation movement changes through an instant of rest, for wheel-spring 9 to rebound to a position of no tension against the resistance of dash-pot 6, forcing dash-pot 6 to complete the amplitude of the corresponding stroke of wheel 3 before the time that wheel 3 starts on the next oscillation stroke in the opposite direction.

If wheel spring 9 is not stiff enough to force dash-pot 6 to complete the amplitude of the corresponding oscillation stroke of wheel 3 until after the time that wheel 3 starts on the next stroke in the opposite direction, then body-spring 4 will change its direction of movement first, and both springs will be free to rebound together in the same direction, giving body 1 an uncomfortable rebound bounce.

In the oscillation frequency range of the said natural frequency of body 1, dash-pot 6 lags behind the corresponding oscillation cycle stroke of wheel 3, due to the yielding of wheel-spring 9 against the resistance of dash-pot 6, but only within each stroke. At the end of each stroke at this frequency or slower, both dash-pot 6 and wheel 3 always start the succeeding stroke in the opposite direction at approximately the same time.

During oscillation of wheel 3 relative to body 1, at oscillation cycle frequencies that are faster than the natural frequency of body 1 on body-spring 4, the yielding of wheel-spring 9 against the resistance of dash-pot 6, when dash-pot 6 is being urged by wheel-spring 9 to move faster than required by said natural body frequency, will not permit wheel-spring 9 to force dash-pot 6 to follow the amplitude or the phase of the oscillation cycles of wheel 3. This is because dash-pot 6 offers increased resistance that is proportional to the square of the speed that wheel 3 trys to force it to move through the medium of wheel-spring 9. Wheel-spring 9 follows Hooke's law, flexing in direct proportion to the pressure exerted upon it, and at relatively fast oscillations it flexes substantially in direct proportion to the speed of movement, against the much greater "speed squared" resistance of dash-pot 6.

As wheel-spring 9 flexes against the resistance of the dash-pot 6 to relatively fast oscillation, the wheel 3 moves faster than, and ahead of, the dash-pot, so that the dash-pot does not have sufficient time to complete the amplitude of the corresponding cycle strokes of wheel 3. The oscillation amplitude of dash-pot 6 will decrease in differential relation to the amplitude of the corresponding oscillation of wheel 3 in the proportion that the oscillation frequency of wheel 3 exceeds the natural frequency of body 1.

As the oscillation amplitude of dash-pot 6 decreases in this relation to frequency increase, the flexing amplitude of wheel-spring 9 will increase in differential relation to the amplitude of the corresponding flexing of body-spring 4, in the proportion that the oscillation frequency of wheel 3 exceeds the natural frequency of body 1. Thus the flexing amplitude of wheel-spring 9 will increase in differential relation to the amplitude of the corresponding oscillation of said dash-pot, at double the proportion that the oscillation frequency of said wheel exceeds said natural body frequency.

When wheel 3 reaches the end of an oscillation stroke it stops. When it then begins the stroke in the opposite direction to complete an oscillation cycle, the wheel-spring 9 will have been compressed, and, in rebounding to relax its tension, it continues to move dash-pot 6 in the direction of the first described stroke of wheel 3. Said first stroke of dash-pot 6 then continues until sometime after the beginning of the return stroke of wheel 3. Thus, on relatively fast oscillation, the dash-pot is caused, by the yielding of wheel-spring 9, to lag substantially out of phase with the oscillation cycles of wheel 3.

The flexing of wheel-spring 9 causes the oscillation cycle of dash-pot 6 to lag differentially out-of-phase with the corresponding oscillation cycle of wheel 3 a part of a cycle that increases in proportion to a full cycle as the oscillation frequency of wheel 3 exceeds the natural frequency of body 1. The out-of-phase oscillation of dash-pot 6 contributes in a marked degree to the smooth riding qualities of a vehicle embodying this invention.

Wheel-spring 9, in flexing against the resistance of dash-pot 6, returns energy to body-spring 4 during oscillations of wheel 3 that are at a frequency faster than the natural frequency of body 1. This condition takes place when wheel 3 encounters a series of chuck holes, or bumps, in a rapid sequence. Then against the resistance of dash-pot 6, wheel-spring 9 assists body-spring 4 to push wheel 3 quickly into depressions before body 1 can drop, and conversely wheel-spring 9 assists the compression of body-spring 4 to help lift wheel 3 out of chuck holes and over bumps. During oscillations of wheel 3 relative to body 1 in the range of the natural frequency of the body, the wheel-spring 9, by being constructed with adequate stiffness, transmits the surplus rebound energy of body-spring 4 to dash-pot 6, and this transmitted energy is then dissipated in the hydraulic resistance of dash-pot 6, thus preventing all bounce of body 1.

Under all conditions part of the surplus rebound energy of body-spring 4 is absorbed by wheel-spring 9 while being compressed. It is momentarily stored in wheel-spring 9 as kinetic energy to await distribution by the differential action of dash-pot 6, in response to oscillation frequency and rate of movement determined by the nature of the road being traversed. On the occasion of oscillations of body frequency or slower, dash-pot 6 absorbs all of the kinetic energy from wheel-spring 9. On the occasion of oscillations faster than body frequency, dash-pot 6 returns part of said kinetic energy to wheel 3. The amount of the kinetic energy stored in the tension of wheel-spring 9, that is returned to wheel 3 during oscillations of wheel 3 relative to body 1, increases in the differential proportion that the oscillation frequency of wheel 3 exceeds the natural frequency of body 1.

The algebraic sum of the tensions of body-spring 4 and wheel-spring 9, reach zero at points in an oscillation cycle that vary during oscillation, according to the differential control of dash-pot 6. The position of wheel 3 in relation to body 1, at which the spring suspension tension tending to urge movement of body 1, is zero, is not permanently fixed in this invention as it is in the conventional spring suspension, but it instead varies according to the contour of the road being traversed. Through this invention the wheels of the vehicle may freely oscillate while the resultant spring tensions algebraically add to a force of zero, so that no spring force urges the vehicle body to move in relation to the horizon. A ride of uncanny steadiness is thus attained.

Wheel-spring 9 may be comprehensively described as a spring linkage for dash-pot 6, of the maximum resilience for permitting wheel 3 to follow the road and for permitting body 1 to ride at even keel in following its inertia, that will be sufficiently resistant to transmit excessive spring reaction energy to dash-pot 6 for dissipation.

The tension-deflection characteristics of wheel-spring 9 in relation to that part of the weight of a vehicle body supported by a respective wheel, cannot be given exactly for all adaptations of this invention, because of several variable factors that influence the determination of its tension. The tension-deflection characteristics required for the best results from the use of this invention, vary according to the natural frequency of the vehicle body, according to the amount of internal friction in the body-spring, and in accordance with the location of the respective wheel as to whether it is on the front or rear of the vehicle.

Vehicles having relatively fast natural frequencies of oscillation require stiffer wheel-springs than do vehicles that have relatively slow natural body frequencies. Interleaf spring friction acts as a shock-absorber resistance to spring oscillation, with the result that in an embodiment of this invention, the stiffness of the wheel-spring, as well as the resistance of the dash-pot, must be less, in inverse proportion to the internal frictional resistance in the body-spring. The efficiency of lubrication of laminated springs used, is an important factor influencing the tension-deflection characteristics of the wheel-spring of this invention.

The improvement in riding quality, which is a principal object of this invention, will be attained by a vehicle that has body-springs which provide a relatively slow natural oscillation frequency to the body, and which have a minimum of internal resistance to flexing such as may be had by the use of helical springs, and wheel-springs which are elastic to the degree that their deflections, when subjected to a force of either compression or extension equal to that portion of the body weight sustained by a respective wheel, are amounts equal to one fourth of the deflection of the body spring under that respective portion of the body weight sustained thereby. A vehicle spring suspension having the above ratio of elasticity of its body-springs to its wheel-springs, provides a natural oscillation frequency to the body, if the body be sustained only by the wheel-springs, that is twice the natural oscillation frequency of the body if it be sustained by the body-springs alone.

An automobile embodying this invention to good advantage may have 640 pounds sustained upon each of its front wheels by body-springs which flex one inch under 80 pounds, and having front wheel-springs which flex one inch under 320 pounds with a safe internal stress at a deflection of two inches, and 960 pounds sustained upon each of its rear wheels by body-springs which flex one inch under 60 pounds, and having rear wheel-springs which flex one inch under 240 pounds with a safe internal stress at a deflection of four inches. The above embodiment of this invention will bring about the maximum out-of-phase action of the dash-pot relative to the body-spring, in regard to both its amplitude of movement and its frequency range.

The flexing of wheel-spring 9 of this invention, makes unnecessary the dash-pot construction in common use, that provides less resistance to body-spring compression than to body-spring rebound or extension movement, of equal rate. The flexing of the wheel-spring 9 eliminates vehicle body vibration caused by wheel oscillation being transmitted through the resistance of dash-pot 6, to the vehicle body 1. The conventional means of minimizing vibration of a vehicle body due to the fast compression movements of a wheel, is to reduce the dash-pot compression resistance relative to its resistance to body-spring extension, by means of a check valve in the hydraulic dash-pot that this invention renders unnecessary.

When a rough road induces very rapid oscillations in wheel 3, the shock-absorber arm 7 does not have time to make an appreciable movement under the flexing effort of wheel-spring 9. Wheel-spring 9 then functions practically as though clamp 12 were secured rigidly to frame 2. Then body-spring 4 and wheel-spring 9 flex together in parallel, joining their resilience to make in effect one spring as stiff as both together. Thus wheel 3 is given a much faster natural frequency in the event of very rapid oscillations than it would have under the influence of body-spring 4 alone. The wheel then freely follows very rapid road bumps by its inherent ability to oscillate rapidly on a stiff spring. There is actually a considerable dampening action exerted by shock-absorber 6. The shock-absorber movement, and thus the amount of energy absorbed, is very small per single oscillation. This is because the oscillations are very fast. Actually the shock-absorber 6 in response to these fast oscillations is absorbing as much energy per minute as it does in checking slower oscillations. The rate of energy absorption would only be reduced by the increased number of reversals during which instants no energy is being absorbed. The fast oscillation of wheels in this manner produces no reactions that have to be absorbed by the body and felt as vibrations. Under similar conditions the conventional spring suspension would have a slower natural wheel frequency, and the wheels would be resisted from jumping off the road by shock-absorber resistance that reacts to vibrate the body of the vehicle.

Under actual road conditions it is very common to have a great variety of frequencies combined within the period of one body oscillation. Under these conditions the mechanism of this invention performs all of the above explained functions at once. The mechanism adds, balances, averages and differentiates the various magnitudes and frequencies of wheel oscillations, providing the combined resilience of both springs for the fast wheel oscillations, providing opposing spring forces with suitable resiliency and shock-absorption for oscillations in the middle frequencies, and provides for the slow body oscillations direct speed-responsive hydraulic resistance sufficient to eliminate all bounce of a vehicle body.

The wheel-spring 9 replaces the usual shock-absorber link that requires two ball-socket joints. Two flexible joints are not required by this invention because of the resiliency of wheel-spring 9 when used as a link. Wheel-spring 9 might advantageously be secured rigidly to axle 5 with ball-socket joint 11 attached instead at the other end of the wheel-spring 9, between clamp 12 and shock-absorber arm 7. A bearing with a lateral axis might be advantageously substituted for ball-socket joint 11, to cause increased resistance of wheel-spring 9 to lateral side-sway of body 1. The resilience of wheel-spring 9 effects the elimination of excessive strain, wear and damage to shock-absorber 6, its arm 7, and connections, that might be caused in conventional shock-absorbing mechanisms by excessive road shocks, incorrect adjustment, or excessive fluid viscosity resulting from low temperatures.

Strictly speaking, wheel 3 of this invention does not have one definite natural frequency as do the wheels of vehicles that are provided with only one spring, or what is effectively one spring per wheel. As wheel 3 oscillates it is always under the full influence of body-spring 4, and under the influence of a part of the resilience of the wheel-spring 9 that is proportional to the frequency of oscillation. Its slowest natural frequency exists during slowest oscillation and its fastest natural frequency occurs just when it is needed at times of most rapid wheel oscillation. This variable natural wheel frequency that inherently fits itself to the road being traversed, insures that less oscillation reaction will be transferred to a vehicle body through the mechanism of this invention, than is transferred by any contemporary spring suspension and shock-absorbing mechanism in existence.

Side-sway of body 1, relative to axle 5, caused by centrifugal force in turning curves, or by excessive slant of a road from horizontal, is minimized by wheel-spring 9. Normally the axle 5 is parallel to a lateral axis of body 1, and wheel-spring 9 is in a plane perpendicular to axle 5. Side-sway of body 1 moves it from its laterally parallel relationship to axle 5. During side-sway clamp 12 maintains its respective end of wheel-spring 9 in perpendicular relationship to said lateral axis of body 1, and clamp 10 with ball-socket joint 11 maintain their respective end of wheel-spring 9 in a fixed relation to axle 5. Thus side-sway of body 1 causes wheel-spring 9 to flex laterally in proportion to the displacement of body 1 from its normally parallel relationship to axle 5. The resistance of wheel-spring 9 to lateral flexing, reduces the magnitude of side-sway movement.

Shock-absorbers having resilient attachment means for linking the shock-absorber arm to the axle are known to the art. Some shock-absorber links incorporate spring, some rubber cushioned ball-socket joints. Some incorporate shock-absorber arms that will flex before breaking. These structures were not designed under a conception of this invention. They are totally different structures not designed with adequate deflection-tension characteristics to fulfill the objectives of this invention which they will not fulfill in any measure.

It is not my intention to limit the invention to the structure disclosed. It is obvious that within the scope and spirit of this invention a different type, shape, form or structure of spring such as a helical spring, might be substituted for wheel-spring 9, to perform the functions of that spring. A similar loop spring might be placed in different positions relative to the dash-pot. It is likewise obvious that in place of body-spring 4 of this invention, there could as well be used any of several other types of vehicle springs; ¾ elliptic, full elliptic, or helical compression springs. The several types of leaf springs might be either of the parallel or transverse type.

I have set forth the objects of my invention, explained the need, the purposes, and the merit of the fulfillment of these objectives, and have explained how they are fulfilled by the functioning of a preferred structure.

What I claim and desire to secure by Letters Patent is the following:

The combination of a body, in a vehicle, a wheel, and a first spring arranged to sustain said body upon said wheel, with a double-acting hydraulic dash-pot attached to said body, which has reluctance to movement of a degree sufficient to limit the amplitude of the reactions to compression and extension of said first spring to movements equal to approximately the amplitude of said respective compression and extension, and a second spring of a coiled type comprising more than one coil, which has one of its ends attached to said dash-pot and its other end attached to said first spring, and which is elastic to the degree that its deflection, when it is subjected to a force of either compression or extension equal to the weight of said body sustained by said first spring, is an amount equal to approximately one fourth of the deflection of said first spring caused by the weight of said body sustained thereby.

ALLEN TRASK.